(12) United States Patent
Kim

(10) Patent No.: US 12,182,532 B1
(45) Date of Patent: Dec. 31, 2024

(54) MIXED-PRECISION MULTIPLY-AND-ACCUMULATION TREE STRUCTURE TO MAXIMIZE MEMORY BANDWIDTH USAGE FOR COMPUTATIONAL ACCELERATION OF GENERATIVE LARGE LANGUAGE MODEL

(71) Applicant: HyperAccel Co., Ltd., Hwaseong-si (KR)

(72) Inventor: Jung-Hoon Kim, Hwaseong-si (KR)

(73) Assignee: HyperAccel Co., Ltd., Hwaseong-si (KR)

(*) Notice: Subject to any disclaimer, the term of this patent is extended or adjusted under 35 U.S.C. 154(b) by 0 days.

(21) Appl. No.: 18/751,662

(22) Filed: Jun. 24, 2024

(30) Foreign Application Priority Data

Jun. 27, 2023 (KR) .................. 10-2023-0082645

(51) Int. Cl.
 *G06F 7/483* (2006.01)
(52) U.S. Cl.
 CPC .................... *G06F 7/483* (2013.01)
(58) Field of Classification Search
 CPC ...................................................... G06F 7/483
 See application file for complete search history.

(56) References Cited

U.S. PATENT DOCUMENTS

2017/0357891 A1* 12/2017 Judd ................. G06N 3/049
2023/0229505 A1* 7/2023 Noh ................. G06F 7/5318
                                                          712/220

FOREIGN PATENT DOCUMENTS

| KR | 10-2021-0057158 | 5/2021 |
|---|---|---|
| KR | 10-2022-0078819 | 6/2022 |
| KR | 10-2022-0133769 | 10/2022 |
| KR | 10-2022-0164573 | 12/2022 |

OTHER PUBLICATIONS

Decision to Grant a Patent mailed Nov. 7, 2023, issued in corresponding Korean Application No. 10-2023-0082645, filed Jun. 27, 2023, 6 pages.
Request for the Submission of an Opinion mailed Aug. 13, 2023, issued in corresponding Korean Application No. 10-2023-0082645, filed Jun. 27, 2023, 11 pages.

* cited by examiner

*Primary Examiner* — Michael D. Yaary
(74) *Attorney, Agent, or Firm* — Christensen O'Connor Johnson Kindness PLLC

(57) ABSTRACT

Provided is a mixed-precision multiply-and-accumulation (MAC) tree structure to maximize memory bandwidth usage for computational acceleration of a generative large language model. A MAC tree-based operator may include a plurality of floating-point (FP) multipliers connected in parallel and configured to process a multiplication operation on data delivered from an external memory; a plurality of first converters configured to convert output of each of the plurality of FP multipliers from floating point to fixed point; a fixed-point (FXP) adder tree connected to the plurality of first converters and configured to process summation of multiplication results of the plurality of FP multipliers; an FXP accumulator configured to accumulate output of the FXP adder tree; and a second converter configured to convert output of the FXP accumulator from the fixed point to the floating point.

8 Claims, 16 Drawing Sheets

FIG. 11

|  | LUT | Flip-Flop | DSP |
|---|---|---|---|
| Only FP | 14076 | 16559 | 255 |
| FP Mult + FXP Add | 6429  45.67% | 15163  91.57% | 193  75.69% |

MIXED-PRECISION MULTIPLY-AND-ACCUMULATION TREE STRUCTURE TO MAXIMIZE MEMORY BANDWIDTH USAGE FOR COMPUTATIONAL ACCELERATION OF GENERATIVE LARGE LANGUAGE MODEL

CROSS-REFERENCE TO RELATED APPLICATION(S)

This application claims the priority benefit of Korean Patent Application No. 10-2023-0082645, filed on Jun. 27, 2023, in the Korean Intellectual Property Office, the disclosure of which is incorporated herein by reference.

BACKGROUND

1. Field of the Invention

Example embodiments relate to a mixed-precision multiply-and-accumulate (MAC) tree structure to maximize memory bandwidth usage for computational acceleration of a generative large language model.

2. Description of the Related Art

Currently, with the rapid development of a generative large language model, a size of a model gradually increases to achieve high precision and has model parameters ranging from as few as millions to as many as billions. Therefore, a lot of data needs to be retrieved from memory at once and operations need to be performed without interruption.

Also, a floating-point (FP) operator is required to support generative large language model operations without loss of accuracy. However, such FP operator has high logic complexity and occupies a large area accordingly.

Reference material includes Korean Patent Laid-Open Publication No. 10-2022-0164573.

SUMMARY

Example embodiments may provide an operator of a hardware accelerator that maximizes usage of a memory bandwidth provided for acceleration of a generative large language model that is difficult to parallelize and has a large amount of data.

Technical subjects of the present invention are not limited to the aforementioned technical subjects and still other technical subjects not described herein will be clearly understood by one of ordinary skill in the art from the following description.

According to an example embodiment, there is provided a multiply-and-accumulation (MAC) tree-based operator including a plurality of floating-point (FP) multipliers connected in parallel and configured to process a multiplication operation on data delivered from an external memory; a plurality of first converters configured to convert output of each of the plurality of FP multipliers from floating point to fixed point; a fixed-point (FXP) adder tree connected to the plurality of first converters and configured to process summation of multiplication results of the plurality of FP multipliers; an FXP accumulator configured to accumulate output of the FXP adder tree; and a second converter configured to convert output of the FXP accumulator from fixed point to floating point.

According to an aspect, the MAC tree-based operator may correspond to one of a plurality of MAC tree-based operators included in a hardware accelerator for acceleration of an artificial intelligence (AI) model.

According to another aspect, at least one of the number of the MAC tree-based operators included in the hardware accelerator and the plurality of FP multipliers included in the MAC tree-based operator may be determined based on a memory bandwidth provided for the hardware accelerator.

According to still another aspect, the plurality of MAC tree-based operators may be configured to perform a matrix multiplication operation for at least one partition among a plurality of partitions that implements the AI model.

According to still another aspect, the external memory may include a high bandwidth memory in which the at least one partition is stored.

According to still another aspect, each of the plurality of FP multipliers may include a mixed-precision FXP exponent adder for addition of exponent; and a mixed-precision FXP mantissa multiplier for multiplication of mantissa.

According to still another aspect, each of the plurality of FP multipliers may be configured to process multiplication between a first operand and a second operand with the same bit precision in response to a high-precision mode being selected and to compute a first result value.

According to still another aspect, each of the plurality of FP multipliers may be configured to simultaneously process first multiplication between a third operand with first bit precision and a (4-1)-th operand with second bit precision and second multiplication between the third operand with first bit precision and a (4-2)-th operand with the second bit precision in response to a high-performance mode being selected and to simultaneously compute a second result value of the first multiplication and a third result value of the second multiplication.

According to still another aspect, the first bit precision may include 16-bit precision, and the second bit precision may include 8-bit precision.

According to an example embodiment, there is provided an operating method of a MAC tree-based operator, wherein the MAC tree-based operator includes a plurality of FP multipliers connected in parallel, a plurality of first converters connected to the plurality of FP multipliers, a fixed-point (FXP) adder tree, an FXP accumulator, and a second converter, and the method includes processing, using the plurality of FP multipliers, a multiplication operation on data delivered from an external memory; converting, using the plurality of first converters, a result of multiplication operation of each of the plurality of FP multipliers from floating point to fixed point; processing, using the FXP adder tree, summation of the converted result of the plurality of FP multipliers; accumulating, using the FXP accumulator, output of the FXP adder tree; and converting, using the second converter, output of the FXP accumulator from fixed point to floating point.

Specific details of other example embodiments are included in the detailed description and drawings.

According to some example embodiments, it is possible to provide an operator of a hardware accelerator that maximizes usage of a memory bandwidth provided for acceleration of a generative large language model that is difficult to parallelize and has a large amount of data.

According to some example embodiments, it is possible to provider an operator that may reduce high hardware resource overhead of a floating point-based MAC tree structure.

According to some example embodiments, it is possible to provide an operator that may effectively support two precision operations and also minimize hardware resource overhead.

Effects of the present invention are not limited to the aforementioned effects and still other effects not described herein will be clearly understood by one of ordinary skill in the art from the following description.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 11 illustrates an example of describing performance of an operator according to an example embodiment;

DETAILED DESCRIPTION

Figure 1:
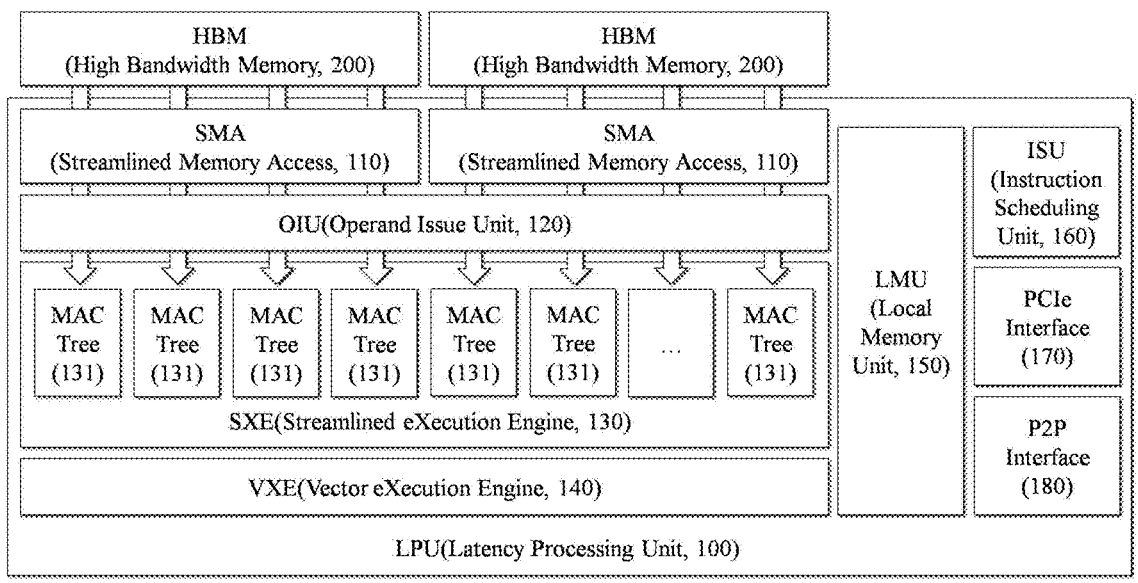
FIG. 1 illustrates an example of a structure of a latency processing unit according to an example embodiment.

Advantages and features of the present invention and methods to achieve the same will become clear with reference to example embodiments described in detail along with the accompanying drawings. However, the present invention is not limited to example embodiments disclosed blow and may be implemented in various forms. Here, the example embodiments are provided to make the disclosure of the present invention complete and to fully inform one of ordinary skill in the art to which the present invention pertains of the scope of the present invention and the present invention is defined by the scope of the claims. Like reference numerals used herein refer to like elements throughout.

When it is described that one component is "connected to" or "coupled to" another component, it may be understood that the one component is directly connected to or coupled to the other component or that still other component is interposed between the two components. In contrast, it should be noted that when it is described that one component is "directly connected to" or "directly coupled to" to another component, still other component may not be present therebetween. As used herein, the expression "and/or" includes any one and any combination of the associated listed items.

The terms used herein are to explain the example embodiments and not to be limiting of the present invention. Herein, the singular forms "a," "an," and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present invention.

Unless otherwise defined herein, all terms used herein (including technical or scientific terms) have the same meanings as those generally understood by one of ordinary skill in the art. Also, terms defined in dictionaries generally used should be construed to have meanings matching contextual meanings in the related art and are not to be construed as an ideal or excessively formal meaning unless otherwise defined herein.

FIG. 1 illustrates an example of a structure of a latency processing unit according to an example embodiment.

Referring to FIG. 1, a latency processing unit (LPU) 100 according to an example embodiment may include a streamlined memory access (SMA) 110, an operand issue unit (OIU) 120, a streamlined execution engine (SXE) 130, a vector execution engine (VXE) 140, a local memory unit (LMU) 150, an instruction scheduling unit (ISU) 160, a peripheral component interconnect express (PCIe) interface 170, and a peer-to-peer (P2P) interface 180.

The SMA 110 may be a special direct memory access (DMA). For example, the SMA 110 may connect all channels (e.g., 32 channels) of high bandwidth memory (HBM) 200 to an execution engine (e.g., SXE 130) and may transmit FP16 (half precision floating point) data at a maximum bandwidth. The SMA 110 may be designed as deep first in first out (FIFO) to transmit consecutive memory requests based on a pre-loaded memory (MEM) instruction. Memory mapping considering hardware may reduce a latency by eliminating matrix change or transposition task. Therefore, the SMA 110 may stream data received with a maximum burst size to an execution engine with a minimum latency. The SMA 110 may efficiently execute transpose of a matrix using a strobe signal. Streaming data may include a parameter for vector matrix execution (e.g., weight, bias) and other vector-related execution (e.g., gamma/beta, embedding).

The OIU 120 may adjust data streamed from the SMA 110 (e.g., first operand) and input from an on-chip memory (e.g., second operand) before issuance to the execution engine. Based on an execute (EXE) instruction, the OIU 120 may generate a microcode that configures the execution engine and determines a target engine of operand. Also, the OIU 120 may include a reuse buffer to eliminate a read idle time of static operand (e.g., input vector) and an asymmetric buffer to maintain vectorized data used as a scalar (e.g., bias). Therefore, an appropriate operand is almost always prefetched and ready to be issued immediately to the execution engine.

The SXE 130 refers to main computing hardware of the LPU 100 and may be designed to make the full use of an incoming bandwidth to execute vector-matrix multiplication (V·M), such as attention, 1D convolution, and feedforward network. The SXE 130 may include the number of multiply-and-accumulation (MAC) trees 131 capable of matching a reception bandwidth and an operation bandwidth of the HBM 200. For example, when 1024 elements are received every cycle from the HBM 200, the reception bandwidth and the operation bandwidth may be matched through 16 MAC trees 131 each having 64 input vectors. The MAC trees 131 each having 64 input vectors may include 64 multipliers and 63 adders.

The plurality of MAC trees 131 may perform a matrix multiplication operation, and may be connected for each channel through the HBM 200 and the SMA 110. In detail, one of the plurality of MAC trees 131 may be connected to the HBM 200 through a single channel and may maximize a transmission bandwidth between the LPU 100 and the HBM 200 and may perform a matrix multiplication operation required for a very large artificial intelligence model without bottlenecking. Therefore, the number of the plurality of MAC trees 131 and the number of memory channels of the HBM 200 may be configured to be the same.

A matrix multiplication operation result of the plurality of MAC trees 131 may be provided to the VXE 140. The VXE 140 may be implemented using a custom low-latency arithmetic logic unit (ALU) and may execute a vector operation, such as token embedding, softmax, normalization, and residual operation. Since this vector operation relatively infrequently occurs, the OIU 120 may adjust fan-in to this path to reduce hardware resources with negligible performance. The VXE 140 may be provided with an operation result of the plurality of MAC trees 131 and may perform a subsequent operation by receiving an activation value from the LMU 150. The VXE 140 may be configured to include various operator combinations by including a plurality of multi-function operation interfaces.

The LMU 150 may deliver the activation value to the plurality of MAC trees 131 and the VXE 140. Here, the LMU 150 may copy and transmit the activation value to deliver the same activation value to the plurality of MAC trees 131. Also, the LMU 150 may store result values operated by the plurality of MAC trees 131 and the VXE 140. That is, the LMU 150 may function within the LPU 100 as an internal buffer corresponding to the HBM 200. Here, in a matrix multiplication operation, the LPU 100 may store an activation value with a high reuse rate or a parameter of a model in the LMU 150 and may store a weight with a low reuse rate in the HBM 200. The LMU 150 may be implemented as a 4 MB multi-bank register file with scalar vector separation for fast, high-bandwidth access of input, output, and intermediate data. Also, the LMU 150 may be a multi-port that simultaneously supports read and write in a write-store stage of the execution engine and the OIU 120.

The ISU 160 may control the overall execution flow of the LPU 100. The ISU 160 may employ a parallel instruction chaining (PIC) method and may consecutively execute dependent instructions using instruction chaining. Since PIC classifies instructions that require independent hardware into a group of dependent instructions (e.g., memory (MEM) instruction, execution (EXE) instruction, network (NET) instruction), all instructions may be executed in parallel with an instruction chain of each group, which may lead to achieving low control overhead and latency saving. Also, the ISU 160 may update a control register (e.g., token and layer number) for engine execution. An internal scheduler may support out-of-order execution of the SXE 130 and the VXE 140 to maximize hardware utilization and a powerful scoreboard may be designed to handle data risk. For example, the ISU 160 may perform scheduling such that the plurality of MAC trees 131 and the VXE 140 may simultaneously perform an operation. Also, by pre-executing an instruction without dependency to maximize a parallel operation, the ISU 160 may minimize an idle time of each operating device and a memory access device and may improve computational throughput and latency accordingly.

The LPU 100 may be connected to a host computer through the PCIe interface 170, may perform an operation by receiving an instruction required for operating the LPU 100, an input value of a very large artificial intelligence model, and a weight from the host computer and then may deliver the result thereof to the host computer.

The LPU 100 may be scaled out to a cluster of the plurality of LPUs connected through the P2P interface 180. The scaled-out cluster structure may further improve acceleration of an operation of the very large artificial intelligence model.

FIGS. 2 to 5 illustrate examples of implementation models of latency processing units (LPUs) according to example embodiments. The foregoing example embodiment of FIG. 1 describes an example of an implementation model using an external memory of the HBM 200. Instead of the HBM 200, a double data rate (DDR) may be used as the external memory. Here, a large model may not be stored in a single device and so, may be separated into a plurality of partitions, and may be stored in external memories for a plurality of devices (plurality of LPUs) by partition. In this case, synchronization between the plurality of devices may be required for inference of the large model.

Figure 2:
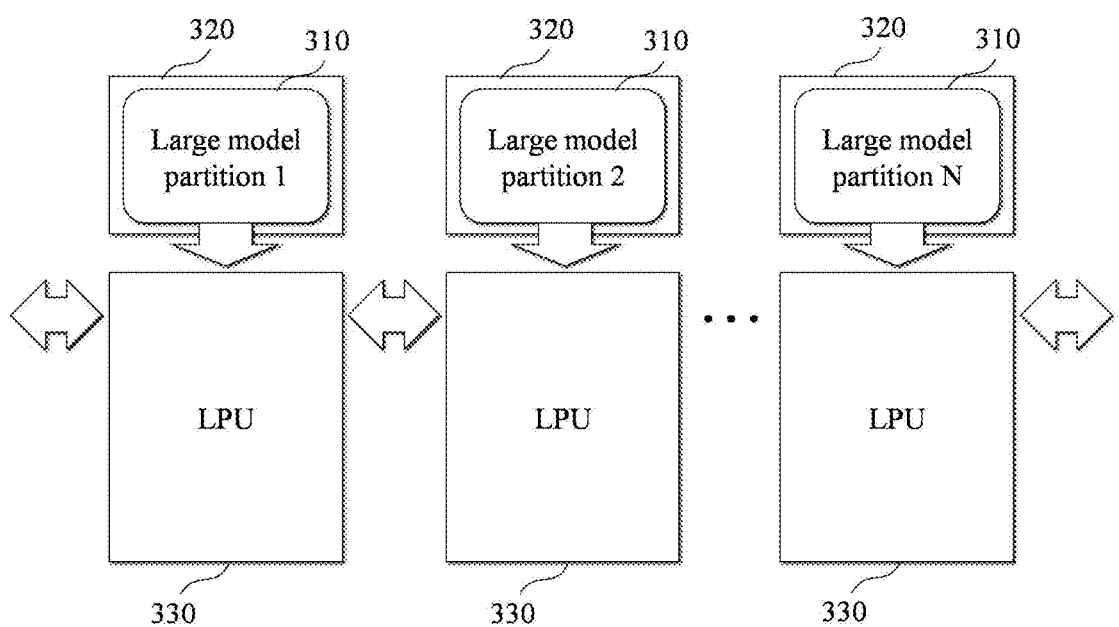
FIGS. 2 to 5 illustrate examples of implementation models of latency processing units (LPUs) according to example embodiments.

Similar to the example embodiment of FIG. 1, the example embodiment of FIG. 2 illustrates a plurality of external memories 320 configured to store a plurality of partitions 310 of a large model and a plurality of LPUs 330 connected in parallel to the plurality of external memories 320. A single LPU may be implemented in a single field programmable gate array (FPGA) and a single partition may be connected in parallel to a single FPGA. A transformer structure includes multi-head attention, layer normalization, feed forward, etc., in a decoder layer and may model-parallelize multi-head attention and feed forward. In this case, when multi-head attention is terminated, a single embedding vector may be output as a result. Since a single device has only a embedding vector portion, a plurality of devices needs to share each embedding vector to move on to a next operation and synchronization may be required accordingly. Here, considering scalability, a single LPU may be implemented with a plurality of external memories (e.g., two or four). For example, the example embodiment of FIG. 1 shows an example of using two HBMs 200 each in which a single partition is stored.

Figure 3:
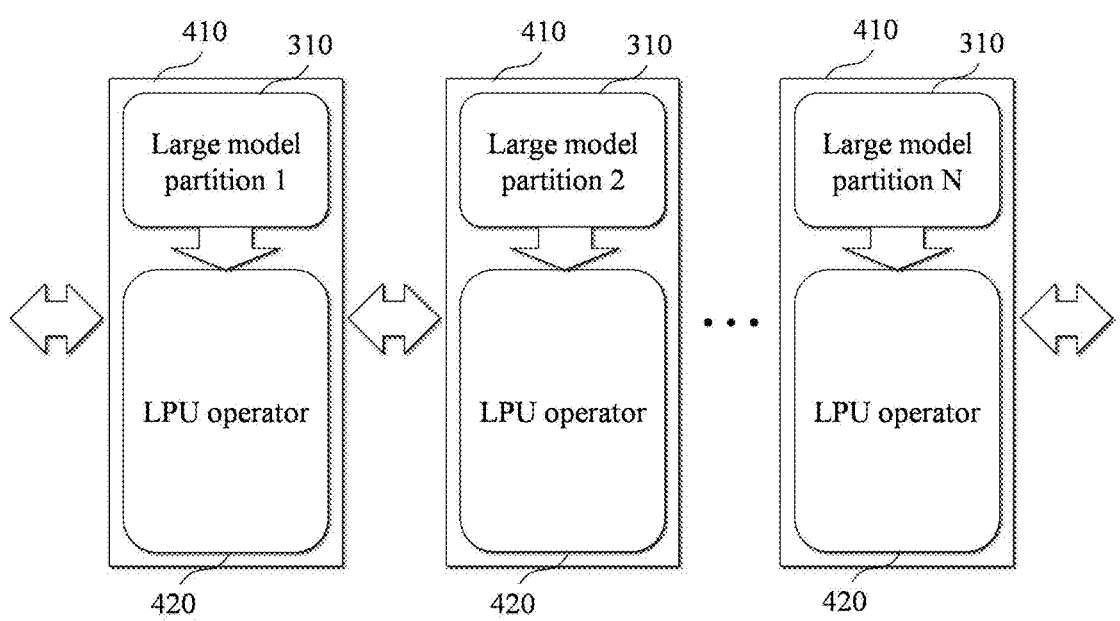

The example embodiment of FIG. 3 is an example of a processing-in-memory (PIM) model and shows an example in which a single LPU is implemented as a PIM chip and both a partition and an LPU operator are integrated into a single chip. The example embodiment of FIG. 3 illustrates a plurality of LPUs 410, a plurality of partitions 310, and a plurality of LPU operators 420, which may each be implemented with a single PIM chip. Here, each of the plurality of LPUs 410 may include a single partition 310 and a single LPU operator 420.

Figure 4:
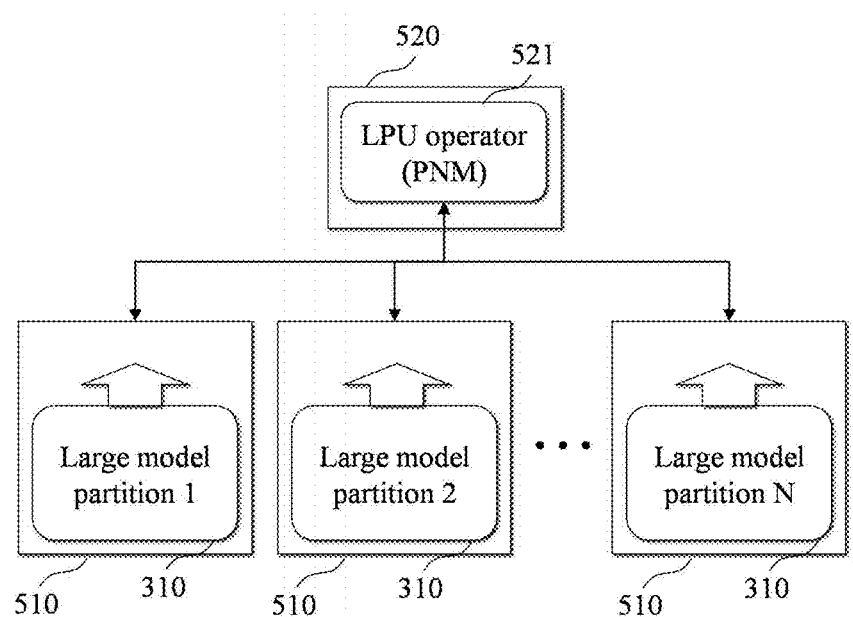

The example embodiment of FIG. 4 shows an example of a processing-near-memory (PNM) model. It may be difficult to include a configuration for processing all LPU operations in a single PIM chip. The example embodiment of FIG. 4 shows a model that stores the plurality of partitions 310 in a plurality of memory chips 510, respectively, and includes an LPU operator 521 for an LPU operation in a buffer chip 520, such as a PNM chip.

Figure 5:
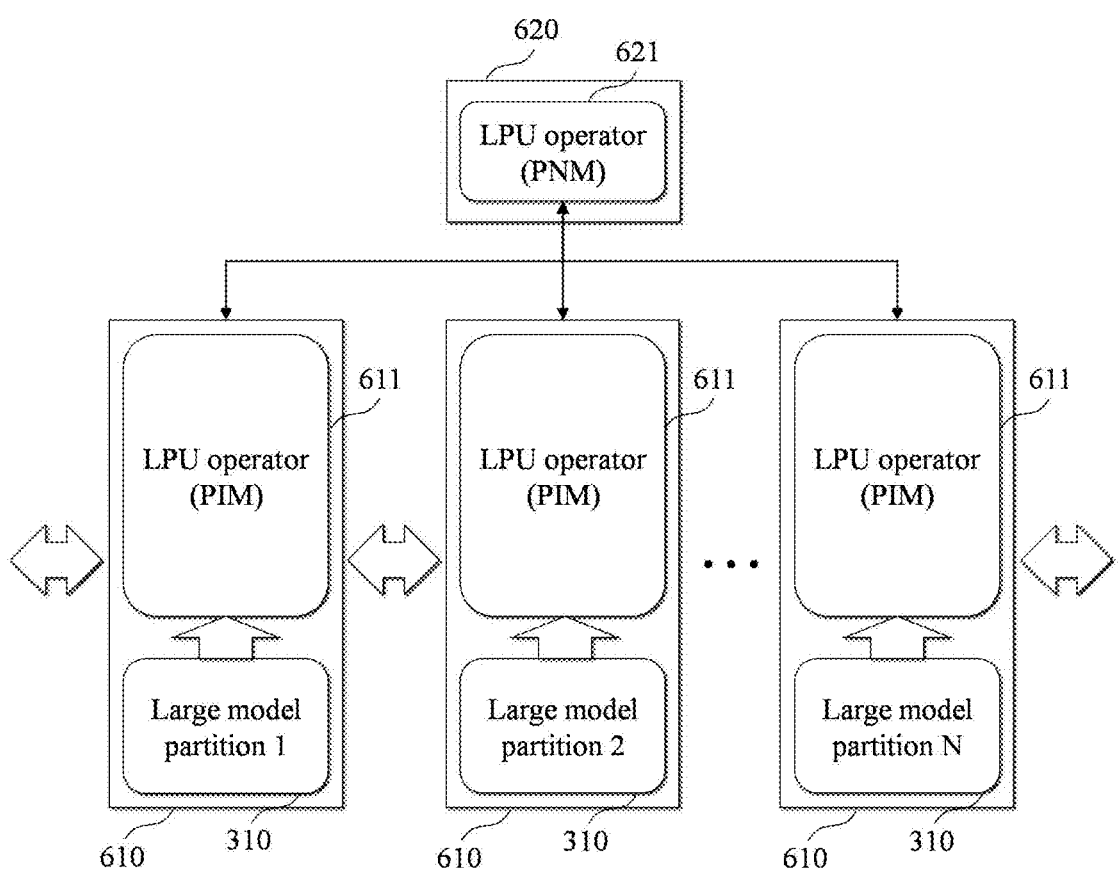

The example embodiment of FIG. 5 shows an example of a model in which PIM and PNM are combined. For example, the plurality of partitions 310 may be stored in a plurality of memory chips 610, respectively. Also, a PIM-type LPU operator 611 may be implemented in each of the plurality of memory chips 610, as an accumulator such as a MAC tree. Here, an LPU operator 621 for the remaining high-level operation of LPU may be implemented in a buffer chip 620 using a PNM method.

Figure 6:
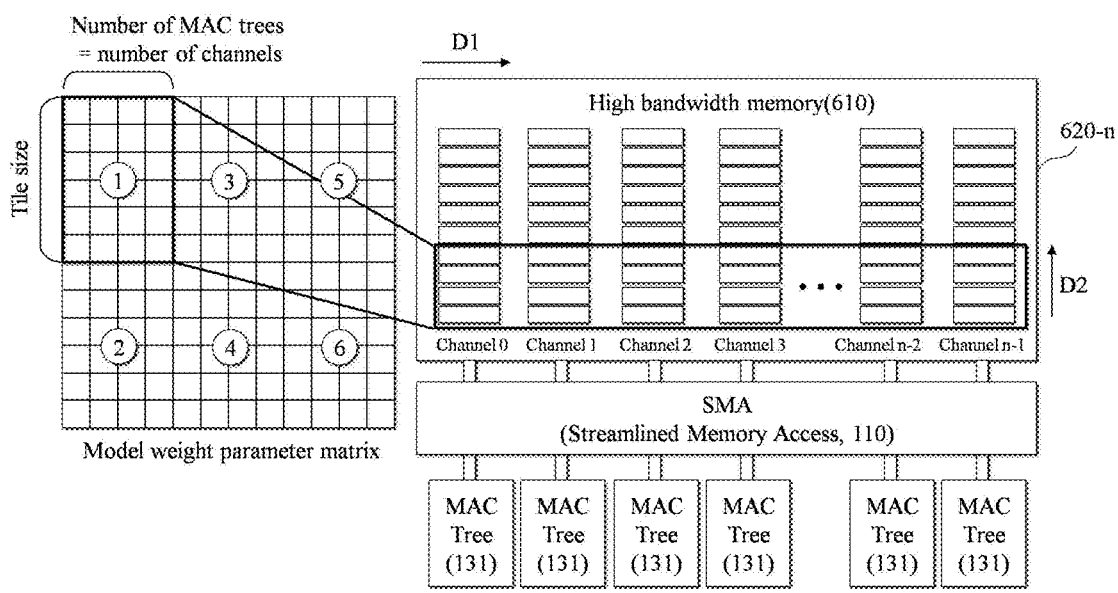
FIG. 6 illustrates an example of describing weight matrix data mapping of a high bandwidth memory for a matrix multiplication operation of a latency processing unit according to an example embodiment.

FIG. 6 illustrates an example of describing weight matrix data mapping of a high bandwidth memory for a matrix multiplication operation of a latency processing unit according to an example embodiment.

Referring to FIG. 6, the LPU 100 according to the example embodiment may store mapped weight matrix data in the high bandwidth memory 610, such as the HBM 200, to make it possible to load weight data without accessing other memory channels during a matrix multiplication operation of each MACT tree, based on the fact that the number of the plurality of MAC trees 131 and the number of memory channels of the SMA 110 are the same.

In detail, weight matrix data may be stored in the high bandwidth memory 610 to be mapped to each channel 620-$n$ as many as the number of the plurality of MAC trees 131 in a column direction (D1) of the weight matrix. Since matrix multiplication operations may be performed in parallel in the column direction of the weight matrix, the plurality of MAC trees 131 may read column direction data from each allocated memory channel 620-$n$ and may perform the matrix multiplication operation.

Then, the plurality of MAC trees 131 may map the weight matrix data such that a final operation result may be completed through accumulation in a row direction D2 of the weight matrix. The number of row data to be mapped at a time may be determined by a bandwidth of the high bandwidth memory 610, which may be determined by a tile size that the plurality of MAC trees 131 may process at a time.

Figure 7:
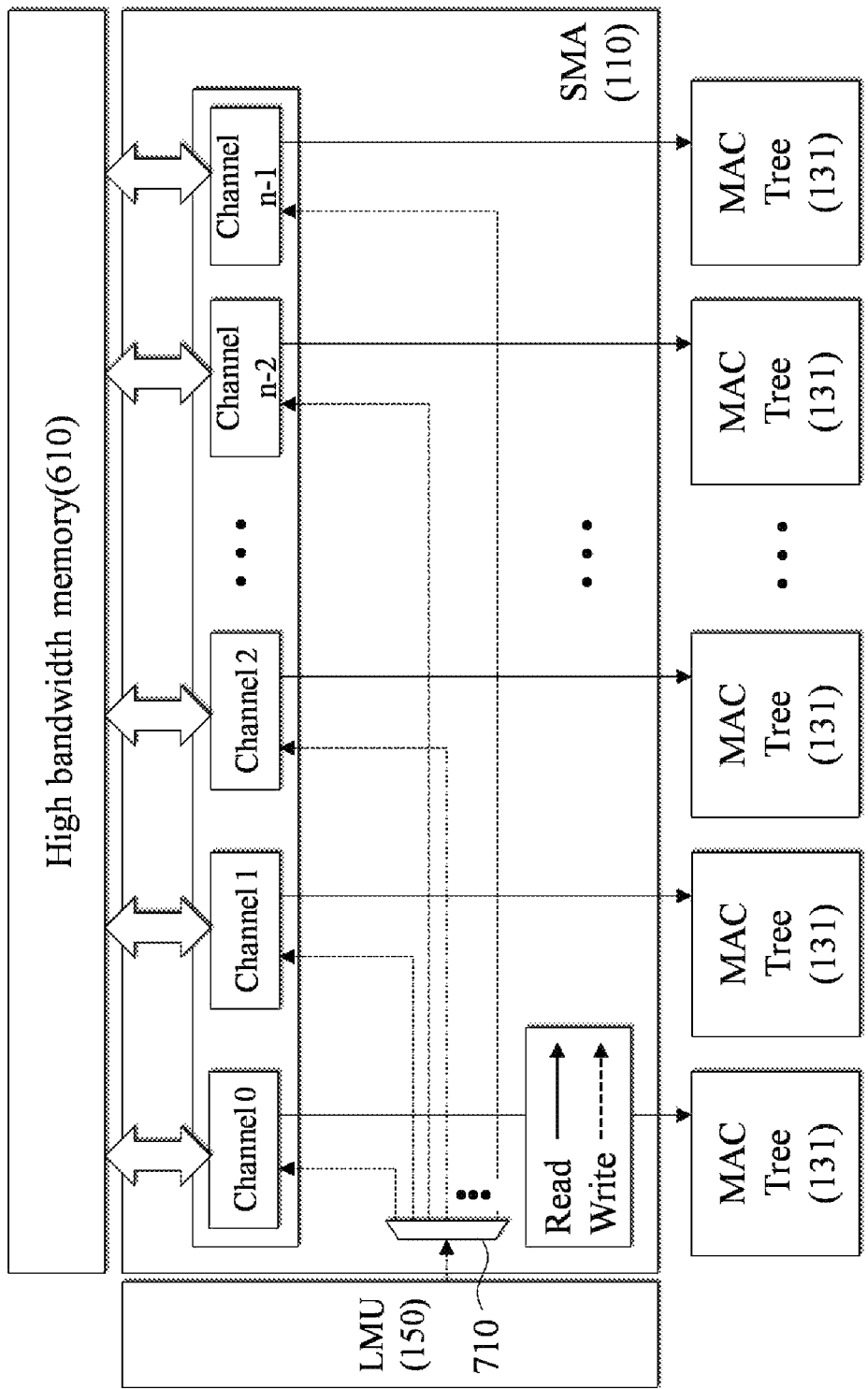
FIG. 7 illustrates an example of a high bandwidth memory interface included in a latency processing unit according to an example embodiment.

FIG. 7 illustrates an example of a high bandwidth memory interface included in a latency processing unit according to an example embodiment.

Referring to FIG. 7, the SMA 110 may connect the LMU 150, the plurality of MAC trees 131, and the high bandwidth memory 610. Since the SMA 110 is not connected to other operating devices of the LPU 100, a high bandwidth memory interface may be minimized in terms of hardware resources.

The plurality of MAC trees 131 and the memory channels 620-$n$ may be connected to each other based on a one-to-one correspondence. That is, each of the plurality of MAC trees 131 does not need to access channels other than a directly assigned channel and accordingly, may perform a matrix multiplication operation without using a complex interface that uses many resources and has a high latency, for example, a cross-bar.

The SMA 110 may configure only a read interface that allows the plurality of MAC trees 131 to retrieve and read weight matrix data stored in the high bandwidth memory 610. That is, as described below, since an operation result is stored in the high bandwidth memory 610 through the LMU 150, a write interface for the high bandwidth memory 610 of the plurality of MAC trees 131 is not configured and corresponding hardware resources may be reduced accordingly.

In contrast, the SMA 110 may configure only a write interface between the LMU 150 and the high bandwidth memory 610. An operation result stored in the LMU 150 as an internal buffer through the SMA 110 may be transmitted to be recorded in the high bandwidth memory 610 and a memory channel for recording may be selected using a demultiplexer 710.

Figure 8:
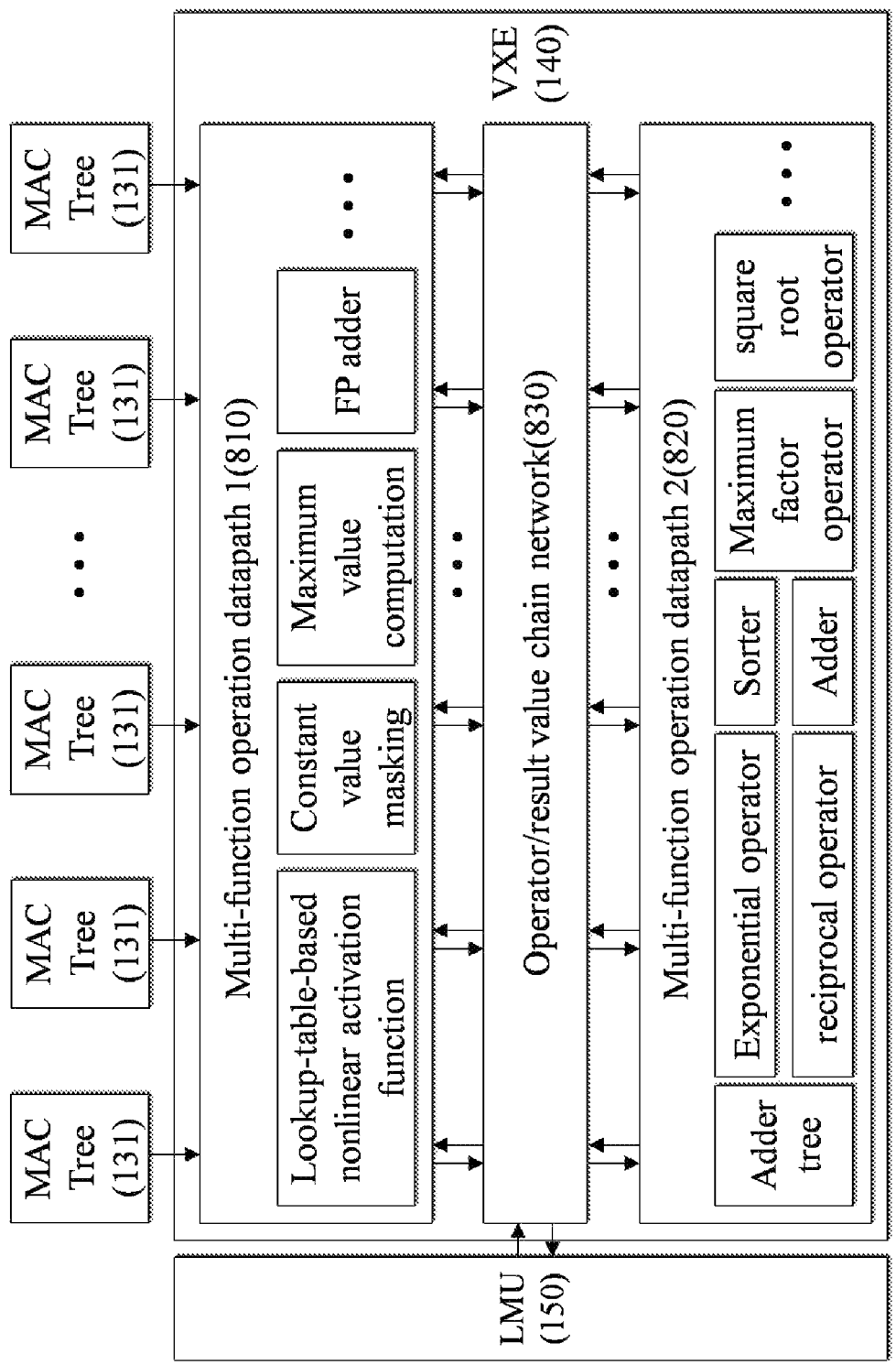
FIG. 8 illustrates an example of describing a reconfigurable multi-function operating device included in a latency processing unit according to an example embodiment.

FIG. 8 illustrates an example of describing a reconfigurable multi-function operating device included in a latency processing unit according to an example embodiment.

Referring to FIG. 8, the VXE 140 may include a plurality of multi-function operation datapaths 810 and 820, and the plurality of multi-function operation datapaths 810 and 820 may configure various operator combinations through connection to an operator/result value chain network 830.

As shown in FIG. 8, the plurality of multi-function operation datapaths 810 and 820 may include various operating devices required for, for example, a lookup-table-based nonlinear activation function, a masking operation and the like. However, the configuration of operating devices of the reconfigurable multi-function operation datapaths 810 and 820 is an example only and any additional operating device required for a large model operation may be included in the multi-function operation datapaths 810 and 820. An operation result by the VXE 140 may be delivered to the LMU 150.

Figure 9:
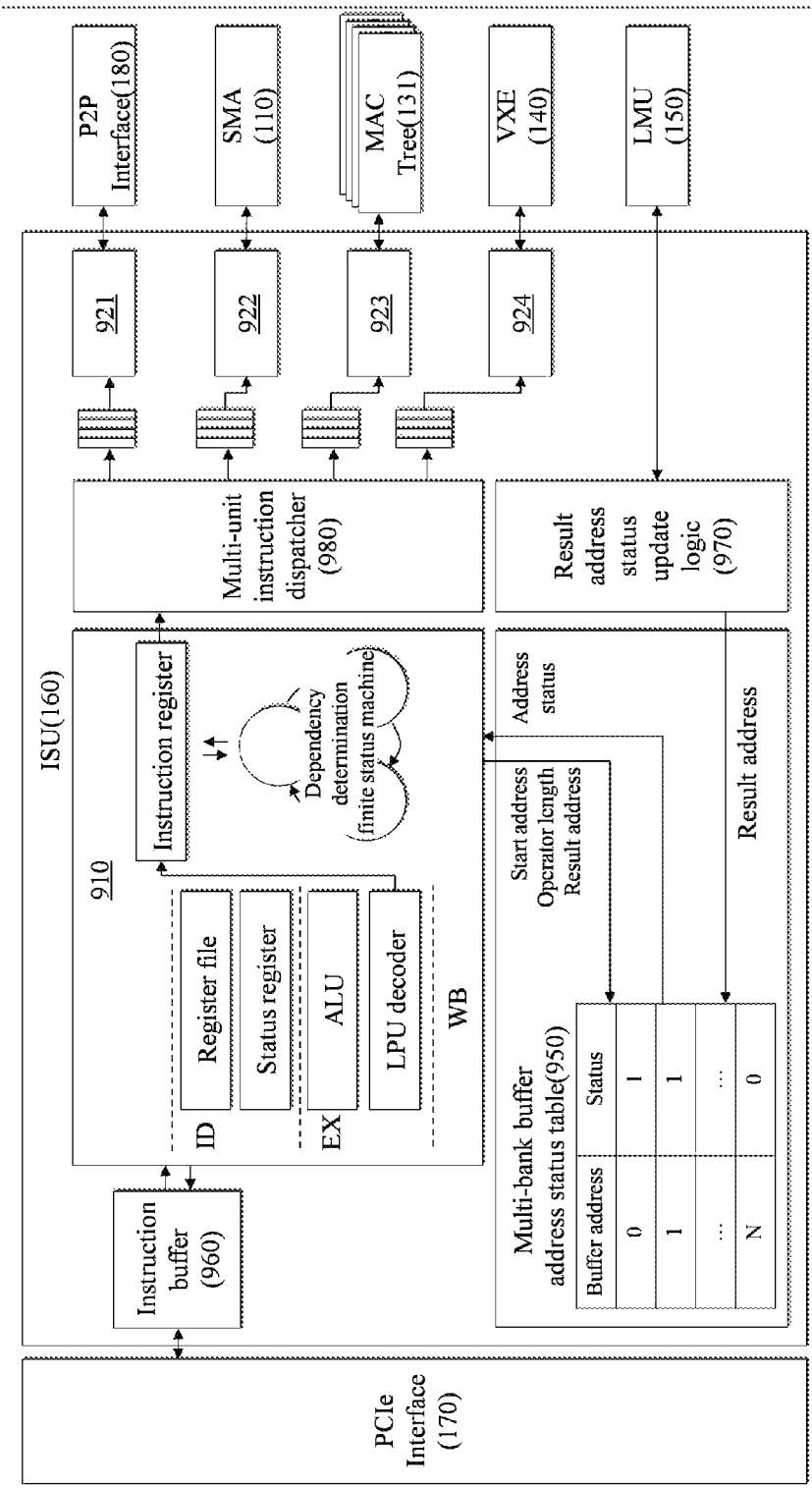
FIG. 9 illustrates an example of describing a configuration of an address-based out-of-order multi-unit scheduler included in a latency processing unit according to an example embodiment.

FIG. 9 illustrates an example of describing a configuration of an address-based out-of-order multi-unit scheduler included in a latency processing unit according to an example embodiment.

Referring to FIG. 9, the ISU 160 as the address-based out-of-order multi-unit scheduler included in the LPU 100 according to the example embodiment may include an address-based instruction dependency decision and scheduling controller 910, a plurality of instruction issue controllers 921, 922, 923, and 924, a multi-bank buffer address status table 950, an instruction buffer 960, a result address status update logic 970, and a multi-unit instruction dispatcher 980.

The ISU 160 may simultaneously operate operating devices and data transfer units through the address-based instruction dependency decision and scheduling controller 910 and the plurality of instruction issue controllers 921, 922, 923, and 924. Here, the ISU 160 may change a status for an operator address and a result address of the multi-bank buffer address status table 950 for an instruction performed in each operating device to 1.

The multi-bank buffer address status table 950 may change a status of a result address of a completed instruction through the result address status update logic 970 to 0.

The address-based instruction dependency decision and scheduling controller 910 may determine dependency between an instruction to be executed and an instruction being executed and dependency between instructions to be executed by referring to an address status through the multi-bank buffer address status table 970. Through this, since an instruction without dependency may be processed in advance, an idle time of each operating device and data transfer unit may be minimized.

The address-based instruction dependency decision and scheduling controller 910 included in the ISU 160 may load and process an instruction from the instruction buffer 960. Here, the address-based instruction dependency decision and scheduling controller 910 may execute a loop instruction and may decode other instructions and classify the instructions and then may deliver the same to the device-to-device (D2D) instruction issue controller 921, the direct memory access instruction issue controller 922, the MAC tree instruction issue controller 923, and the reconfigurable multi-function operating device instruction issue controller 924 through the multi-unit instruction dispatcher 980.

The ISU 160 may receive and store instructions of the LPU 100 from the host computer through the PCIe interface 170 and may store a current status of the LPU 100 in a register. The host computer may verify a corresponding status register through the PCIe interface 170.

Figure 10:
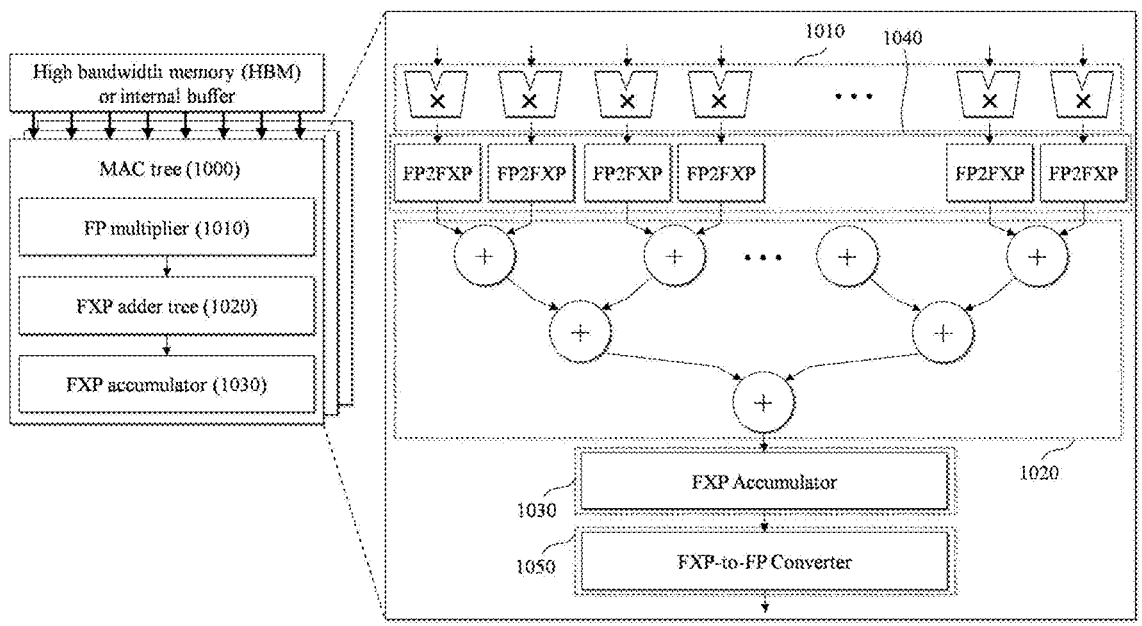
FIG. 10 illustrates an example of an internal configuration of a multiply-and-accumulation (MAC) tree according to an example embodiment.

FIG. 10 illustrates an example of an internal configuration of a MAC tree according to an example embodiment. A MAC tree 1000 according to the example embodiment may correspond to the aforementioned MAC tree 131. The MAC tree 1000 may include a floating-point (FP) multiplier 1010, a fixed-point (FXP) adder tree 1020, and an FXP accumulator 1030.

The FP multiplier 1010 may be implemented in a structure in which a plurality of FP multipliers is connected in parallel, to seamlessly perform a MAC operation with weight data retrieved from an external memory, such as high bandwidth memory (HBM) (e.g., high bandwidth memory 610) or an internal buffer (e.g., LMU 150).

Also, the FXP adder tree 1020 and the FXP accumulator 1030 may be implemented in a form connected to the FP multiplier 1010 to accumulate multiplication results of the FP multiplier 1010. Here, the FXP adder tree 1020 may process summation of multiplication results of the FP multiplier 1010 and the FXP accumulator 1030 may accumulate output of the FXP adder tree 1020.

The MAC tree 1000 may further include an FP-to-FXP (FP2FXP) converter 1040 configured to convert the output of the FP multiplier 1010 from floating point to fixed point.

An operator based on this MAC tree 1000 may be designed to set the number of multipliers or the number of MAC trees 1000 based on a provided memory bandwidth and to efficiently use all the provided memory bandwidth. Here, the MAC tree 1000 may further include an FXP-to-FP (FXP2FP) converter 1050 configured to convert the output of the FXP accumulator 1030 from the fixed point to the floating point.

To reduce the logic complexity of FP operators and the resulting large area burden while maintaining accuracy, multipliers were used as FP operators and adders were used as FXP operators.

FIG. 11 illustrates an example of describing performance of an operator according to an example embodiment. FIG. 11 shows resource differences when all multipliers and an adder tree are implemented as FP operators in a MAC tree-based operator and when the multipliers are implemented as FP operators and the adder tree is implemented as an FXP operator as in an example embodiment. In particular, when implemented with FPGA, an FXP adder may replace look-up table (LUT) logic resources with digital signal processing (DSP) such that the LUT logic resources may not be used. DSP is a circuit included in the FPGA and thus, may reduce area overhead through a provided operator structure and may be implemented at high frequency. For example, FIG. 11 shows resource difference of each of LUT, flip-flop, and DSP when implemented with the FPGA. Resources are reduced in all three aspects, LUT, flip-flop, and DSP. In particularly, it can be seen that LUT responsible for most hardware resources shows resource reduction of 50% or more.

Meanwhile, in the case of an operation that uses a model weight as an operand among operations of a language model (e.g., an operation that generates query, key, and value in attention operation), the operation may be performed with relatively low-precision data. On the other hand, in the case of an operation that uses an activation value as an operand among operations of the language model (e.g., a score operation that uses query, key, and value as operands), the operation needs to be performed with high-precision data. In the case of using an operator that supports only one precision, high precision, memory bandwidth may not be efficiently used when performing an operation with relatively low-precision data and the operation may be performed with unnecessarily high precision accordingly.

Therefore, to efficiently support both high precision and low precision, a mixed-precision FP multiplier that supports two modes may be provided and may change the two modes in real time. A first mode is a high-precision mode capable of performing an operation with high precision and a second mode is a high-performance mode with relatively low precision, but high computation bandwidth. This mixed-precision FP multiplier may selectively perform the two modes with only one multiplier through preprocessing of an operand and postprocessing of a result value and, through this, may save logic overhead of the mixed-precision FP operator.

Figure 12:
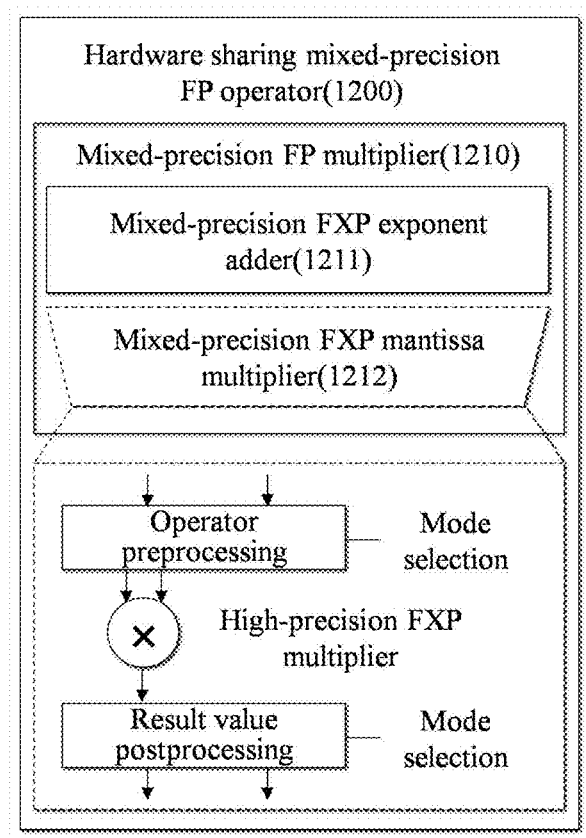
FIG. 12 illustrates an example of describing a mixed-precision floating-point (FP) multiplier according to an example embodiment.
Figure 13:
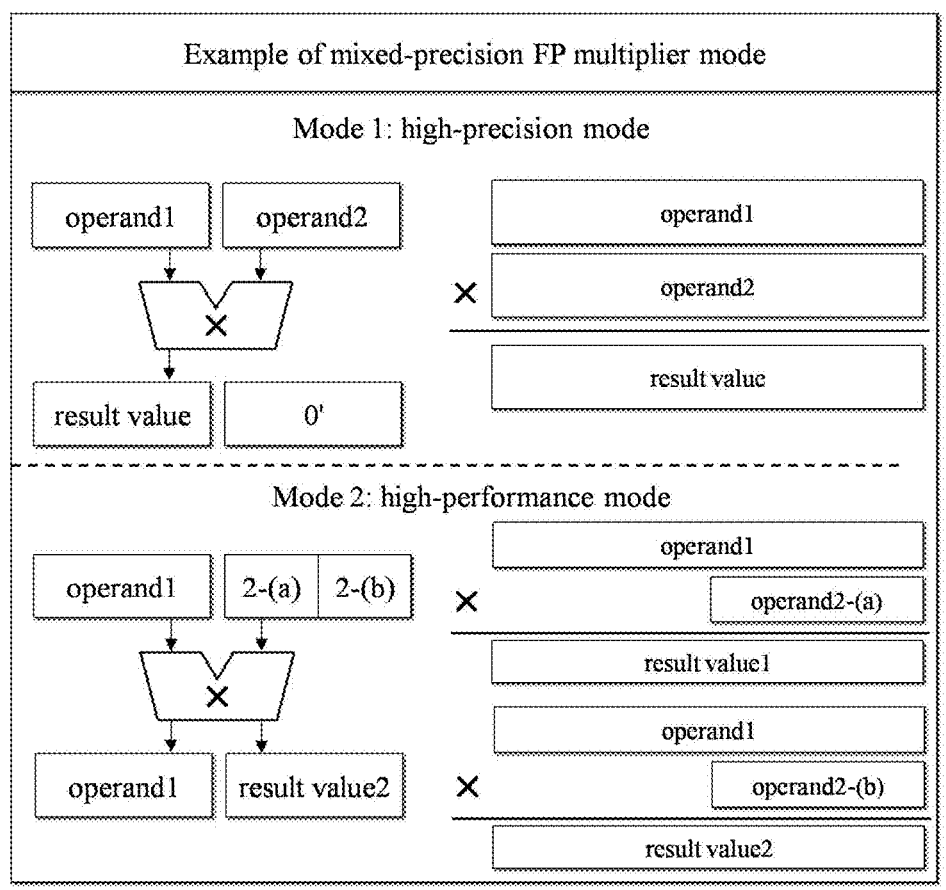
FIG. 13 illustrates an example of two modes of a mixed-precision FP multiplier according to an example embodiment.

FIG. 12 illustrates an example of a structure of a mixed-precision FP multiplier according to an example embodiment, and FIG. 13 illustrates an example of two modes of a mixed-precision FP multiplier according to an example embodiment.

Referring to FIG. 12, a hardware sharing mixed-precision FP operator 1200 may include a mixed-precision FP multiplier 1210, and the mixed-precision FP multiplier 1210 may include a mixed-precision FXP exponent adder 1211 and a mixed-precision FXP mantissa multiplier 1212.

Referring to FIGS. 12 and 13, the mixed-precision FP multiplier 1210 may support a high-precision mode such as a 16-bit mode and may also support a faster computation through a high-performance mode such as an 8-bit mode.

When operating in a high-precision mode, the mixed-precision FP multiplier 1210 may receive two operands (operand1 and operand2) with the same bit precision from the LMU 150 and the high bandwidth memory 610, respectively, and may perform a multiplication operation with the maximum bit precision supported by the mixed-precision FP multiplier 1210.

Also, when operating in a high-performance mode, the mixed-precision FP multiplier 1210 may perform two or more multiplications. For example, as shown in FIG. 13, the mixed-precision FP multiplier 1210 may simultaneously perform multiplications of two operands (2-(a) and 2-(b)) for a single operand (operand1) and may acquire two multiplication results (result value1 and result value2). To this end, the hardware sharing mixed-precision FP operator 1200 may perform an operation by quantizing model parameters with less precision.

Figure 14:
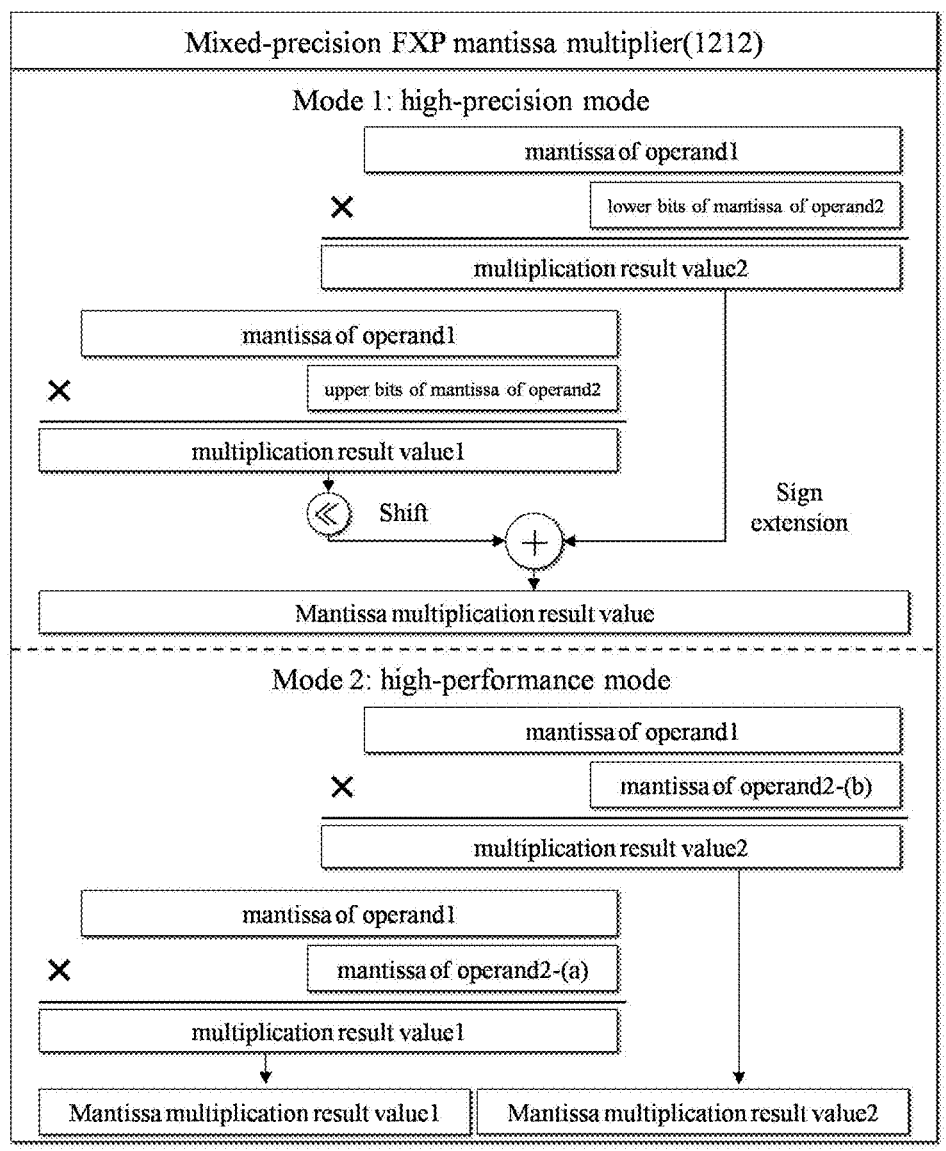
FIG. 14 illustrates an example of a mixed-precision fixed-point (FXP) mantissa multiplier according to an example embodiment.
Figure 15:
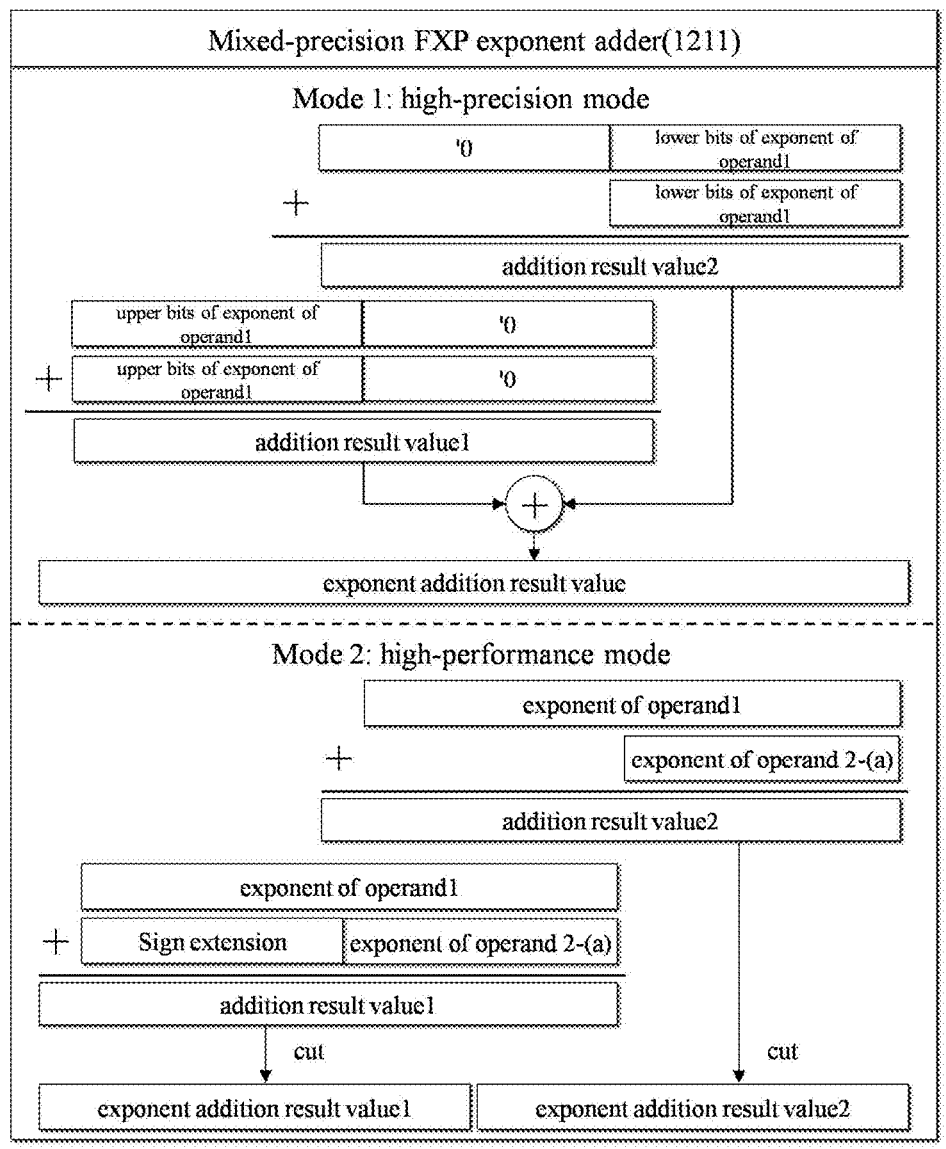
FIG. 15 illustrates an example of a mixed-precision FXP exponent adder according to an example embodiment.

FIG. 14 illustrates an example of a mixed-precision FXP mantissa multiplier according to an example embodiment, and FIG. 15 illustrates an example of a mixed-precision FXP exponent adder according to an example embodiment.

Since the mixed-precision FXP mantissa multiplier 1212 operates by varying preprocessing of an operator and post-processing of a result value according to the aforementioned mode, the mixed-precision FP multiplier 1210 may selectively perform a high-precision FP multiplication operation and a high-performance FP multiplication operation with only a single FXP multiplier, for example, the mixed-precision FXP mantissa multiplier 1212, saving hardware resources.

Here, the mixed-precision FXP mantissa multiplier 1212 performs the two multiplications and then postprocesses to implement two modes, the high-precision mode and the high-performance mode.

In the high-precision mode, first multiplication of two multiplications is multiplication between lower bits of the mantissa of operand1 and the mantissa of operand2 and second multiplication is multiplication between upper bits of the mantissa of operand1 and the mantissa of operand2. Then, the mixed-precision FXP mantissa multiplier 1212 may derive a final mantissa multiplication result value by performing a shift on a first multiplication result (multiplication result value1) and performing a sign extension on a second multiplication result (multiplication result value2) and by adding them.

Then, in the high-performance mode, first multiplication of the two multiplications is multiplication between the mantissa of operand1 and the mantissa of operand2-($a$) and second multiplication is multiplication between the mantissa of operand1 and the mantissa of operand2-($b$). Then, the mixed-precision FXP mantissa multiplier 1212 may derive two mantissa multiplication result value by concatenating the respective multiplication results (multiplication result value1 and multiplication result value2) without postprocessing.

Also, not only the mixed-precision FXP mantissa multiplier 1212 but also the mixed-precision FXP exponent adder 1211 may selectively perform high-precision and high-performance FP multiplication operations through operator preprocessing and postprocessing and may save hardware resources. An operation result of the mixed-precision FP multiplier 1210 may be subjected to a partial sum operation through the FXP adder tree 1020 and the FXP accumulator 1030 of FIG. 10. A matrix multiplication operation result output from the MAC tree 131 may be immediately provided to the VXE 140 to minimize a time required for memory access and resulting latency.

Here, the mixed-precision FXP exponent adder 1211 implements two modes through postprocessing after performing preprocessing of each operator and two additions.

Initially, a case in the high-precision mode is described. A first operator of first addition adds 0 to a most significant bit part in lower bits of the exponent of operand1 and a second operator is a lower bit of the exponent of operand2. A first operator of second addition adds 0 to a least significant bit part in upper bits of the exponent of operand1 and a second operator adds 0 to a least significant bit part in upper bits of the exponent of operand2. The mixed-precision FXP exponent adder 1211 derives a final exponent addition result value by performing the two additions and by adding the respective operation results.

Then, a case in the high-performance mode is described. A first operator of first addition is the exponent of operand1 and a second operator is the exponent of operand2-($b$). A first operator of second addition is the exponent of operand1 and a second operator is sign-extension of the exponent of operand2-($a$). The mixed-precision FXP exponent adder 1211 may derive two exponent result values by performing two additions and then cutting and concatenating the respective operation results.

Figure 16:
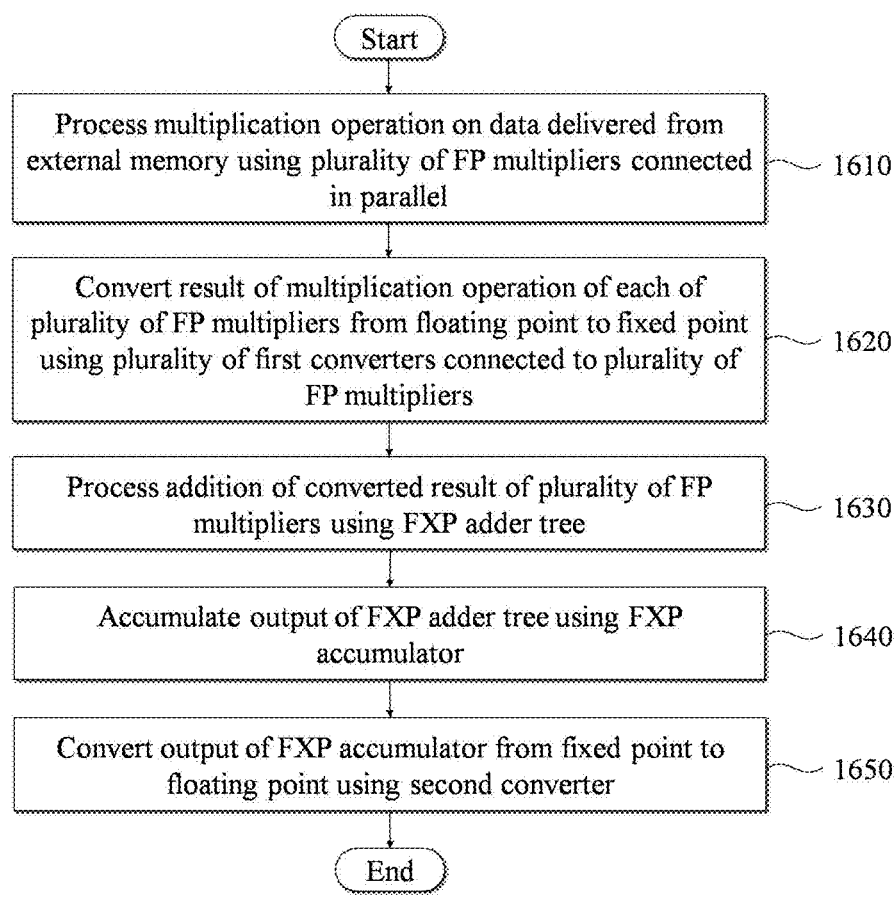
FIG. 16 is a flowchart illustrating an example of an operating method of a MAC tree-based operator according to an example embodiment.

FIG. 16 is a flowchart illustrating an example of an operating method of a MAC tree-based operator according to an example embodiment. The MAC tree-based operator may correspond to the MAC tree 1000 described above with FIG. 10. This MAC tree-based operator may correspond to one of a plurality of MAC tree-based operators included in a hardware accelerator (e.g., LPU 100) for acceleration of an AI model.

Here, at least one of the number of MAC tree-based operators included in the hardware accelerator and the number of plurality of FP multipliers included in the MAC tree-based operator may be determined based on memory bandwidth provided for the hardware accelerator. Also, the plurality of MAC tree-based operators may perform a matrix multiplication operation for at least one partition among a plurality of partitions that implements the AI model.

Through this, the memory bandwidth may be effectively used to process a large amount of data of a generative large AI model.

In operation 1610, the MAC tree-based operator may process a multiplication operation on data delivered from an external memory using a plurality of FP multipliers connected in parallel. The external memory may include a high bandwidth memory in which at least one partition is stored and a local memory unit (e.g., LMU 150) included in a hardware accelerator. Also, each of the plurality of FP multipliers may include a mixed-precision FXP exponent adder (e.g., mixed-precision FXP exponent adder 1211) for addition of the exponent and a mixed-precision FXP mantissa multiplier (e.g., mixed-precision FXP mantissa multiplier 1212) for multiplication of the mantissa.

As described above, each of the plurality of FP multipliers may operate depending on a high-precision mode and a high-performance mode. For example, each of the plurality of FP multipliers may process multiplication between a first operand and a second operand with the same bit precision in response to the high-precision mode being selected and may compute a first result value. Also, each of the plurality of FP multipliers may simultaneously process first multiplication between a third operand with first bit precision and a (4-1)-th operand with second bit precision and second multiplication between the third operand and a (4-2)-th operand with the second bit precision in response to the high-performance mode being selected and may simultaneously compute a second result value of the first multiplication and a third result value of the second multiplication. For example, the first bit precision may include 16-bit precision, and the second bit precision may include 8-bit precision.

In operation 1620, the MAC tree-based operator may convert a result of multiplication operation of each of the plurality of FP multipliers from floating point to fixed point using a plurality of first converters connected to the plurality of FP multipliers. Here, the plurality of first converters may correspond to the FP2FXP converters 1040 described above with FIG. 10.

In operation 1630, the MAC tree-based operator may process summation of the converted result of the plurality of FP multipliers using an FXP adder tree. Here, the FXP adder tree may correspond to the FXP adder tree 1020 described above with FIG. 10.

In operation 1640, the MAC tree-based operator may accumulate output of the FXP adder tree using an FXP accumulator. Here, the FXP accumulator may correspond to the FXP accumulator 1030 described above with FIG. 10.

In operation 1650, the MAC tree-based operator may convert output of the FXP accumulator from the fixed point to the floating point using a second converter. Here, the second converter may correspond to the FXP2FP converter 1050 described above with FIG. 10.

As described above, according to some example embodiments, it is possible to provide an operator of a hardware accelerator that maximizes usage of provided memory bandwidth for acceleration of a generative large language model that is difficult to parallelize and has a large amount of data. Also, it is possible to provider an operator that may reduce high hardware resource overhead of a floating point-based MAC tree structure. Also, it is possible to provide an operator that may effectively support two precision operations and also minimize hardware resource overhead.

Although the example embodiments are described above with reference to the accompanying drawings, it will be understood by one of ordinary skill in the art that the present invention can be implemented in other specific forms without changing technical spirit or essential features of the invention. Therefore, the example embodiments should be understood in all respects as illustrative and not construed as limiting.

What is claimed is:

1. A multiply-and-accumulation (MAC) tree-based operator comprising:
   a plurality of floating-point (FP) multipliers connected in parallel and configured to process a multiplication operation on data delivered from an external memory;
   a plurality of first converters configured to convert output of each of the plurality of FP multipliers from floating point to fixed point;
   a fixed-point (FXP) adder tree connected to the plurality of first converters and configured to process summation of multiplication results of the plurality of FP multipliers;
   an FXP accumulator configured to accumulate output of the FXP adder tree; and
   a second converter configured to convert output of the FXP accumulator from the fixed point to the floating point,
   wherein the MAC tree-based operator corresponds to one of a plurality of MAC tree-based operators included in a hardware accelerator for acceleration of an artificial intelligence (AI) model, and
   at least one of the number of the plurality of MAC tree-based operators included in the hardware accelerator and the number of the plurality of FP multipliers included in the MAC tree-based operator is determined based on a memory bandwidth provided for the hardware accelerator.

2. The MAC tree-based operator of claim 1, wherein the plurality of MAC tree-based operators is configured to perform a matrix multiplication operation for at least one partition among a plurality of partitions that implements the AI model.

3. The MAC tree-based operator of claim 2, wherein the external memory includes a high bandwidth memory in which the at least one partition is stored and a local memory unit included in the hardware accelerator.

4. The MAC tree-based operator of claim 1, wherein each of the plurality of FP multipliers comprises:
   a mixed-precision FXP exponent adder for addition of the exponent; and
   a mixed-precision FXP mantissa multiplier for multiplication of the mantissa.

5. The MAC tree-based operator of claim 1, wherein each of the plurality of FP multipliers is configured to process multiplication between a first operand and a second operand with the same bit precision in response to a high-precision mode being selected and to compute a first result value.

6. A multiply-and-accumulation (MAC) tree-based operator comprising:
   a plurality of floating-point (FP) multipliers connected in parallel and configured to process a multiplication operation on data delivered from an external memory;
   a plurality of first converters configured to convert output of each of the plurality of FP multipliers from floating point to fixed point;
   a fixed-point (FXP) adder tree connected to the plurality of first converters and configured to process summation of multiplication results of the plurality of FP multipliers;
   an FXP accumulator configured to accumulate output of the FXP adder tree; and
   a second converter configured to convert output of the FXP accumulator from the fixed point to the floating point,
   wherein each of the plurality of FP multipliers is configured to simultaneously process first multiplication between a first operand with first bit precision and a (2-1)-th operand with second bit precision and second multiplication between the first operand and a (2-2)-th operand with the second bit precision in response to a high-performance mode being selected and to simultaneously compute a first result value of the first multiplication and a second result value of the second multiplication.

7. The MAC tree-based operator of claim 6, wherein:
   the first bit precision includes 16-bit precision, and
   the second bit precision includes 8-bit precision.

8. An operating method of a multiply-and-accumulation (MAC) tree-based operator, wherein the MAC tree-based operator comprises a plurality of floating-point (FP) multipliers connected in parallel, a plurality of first converters connected to the plurality of FP multipliers, a fixed-point (FXP) adder tree, an FXP accumulator, and a second converter, and the method comprises:
   processing, using the plurality of FP multipliers, a multiplication operation on data delivered from an external memory;
   converting, using the plurality of first converters, a result of multiplication operation of each of the plurality of FP multipliers from floating point to fixed point;
   processing, using the FXP adder tree, summation of the converted result of the plurality of FP multipliers;
   accumulating, using the FXP accumulator, output of the FXP adder tree; and
   converting, using the second converter, output of the FXP accumulator from the fixed point to the floating point, and
   the MAC tree-based operator corresponds to one of a plurality of MAC tree-based operators included in a hardware accelerator for acceleration of an artificial intelligence (AI) model, and
   at least one of the number of the plurality of MAC tree-based operators included in the hardware accelerator and the number of the plurality of FP multipliers included in the MAC tree-based operator is determined based on a memory bandwidth provided for the hardware accelerator.

\* \* \* \* \*